Sept. 25, 1923.
C. H. KNEELAND
CLAMP
Filed April 14, 1922
1,468,718
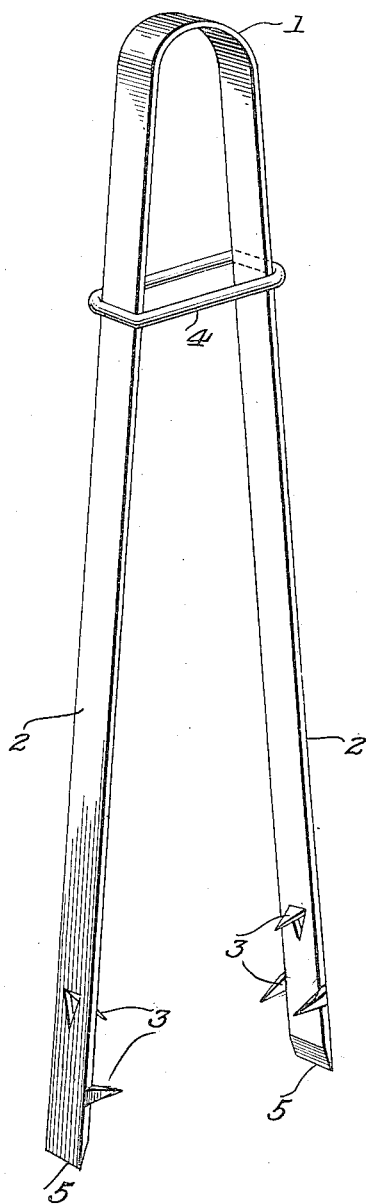
C. H. Kneeland
INVENTOR
BY Victor J. Evans
ATTORNEY
WITNESS:

Patented Sept. 25, 1923.

1,468,718

UNITED STATES PATENT OFFICE.

CYRUS H. KNEELAND, OF MILLINOCKET, MAINE.

CLAMP.

Application filed April 14, 1922. Serial No. 552,775.

*To all whom it may concern:*

Be it known that I, CYRUS H. KNEELAND, a citizen of the United States, residing at Millinocket, in the county of Penobscot and State of Maine, have invented new and useful Improvements in Clamps, of which the following is a specification.

My present invention has reference to a kitchen utensil.

My object is to produce an extremely simple device which may be cheaply manufactured and marketed, and which is of a construction whereby to clampingly engage heated vessels, heated foodstuffs, such as vegetables or meats, cloths for cleaning bottles or utensils and which also serves as a scraper for kitchen utensils.

The foregoing, and other objects which will present themselves as the nature of the invention is better understood, may be accomplished by a construction, such as is disclosed by the drawing which accompanies and which forms part of this specification.

In the drawing:—

The figure illustrates a perspective view of the improvement.

My improvement has its body portion constructed from a single strip of flat spring metal centrally rounded upon itself, as at 1 to provide parallel legs 2. Because of the rounded connection 1, the legs 2 have a tendency to spread away from each other. The legs 2, adjacent to the outer ends thereof, and preferably at diametrically opposed points, are provided with V-shaped slots, and the metal between the slots is bent inwardly to form impinging elements 3.

Slidable over the legs there is a link 4. The link is of a size whereby the outward movement thereof on the legs will cause the said legs to be sprung toward each other. By adjusting the link the impinging elements 3 on the legs can be bought to clamp between the legs heated foodstuffs, such as vegetables, meats, fruits, etc. Also, the legs may clamp therebetween a cloth when bottles, jars or kitchen utensils are to be cleaned. One or both of the legs 2 has its outer end and its edges sharpened, as at 5, and these sharpened portions provide a means whereby the improvement may be employed for scraping pans or kettles. The device can be successfully employed in a great many other connections than those above set forth, and it is thought that the foregoing description, when taken in connection with the drawing will fully set forth the construction and advantages of the improvement to those skilled in the art to which such inventions relate.

The lower impinging elements 3 are formed on the edges of the legs 2, the upper impinging elements being provided by forming the said legs with V-shaped slots and bending outwardly the metal bounded by the slots.

Having described the invention, I claim:—

A kitchen appliance, comprising a member formed from a single strip of spring material centrally rounded upon itself to provide opposed legs which normally spring away from each other, said legs having their inner faces adjacent their outer ends provided with impinging elements, the outer ends of the legs and the edges thereof adjacent said ends being sharpened, and a link slidable over the legs for forcing the same toward each other.

In testimony whereof I affix my signature.

CYRUS H. KNEELAND.